(12) United States Patent
Lee et al.

(10) Patent No.: US 9,609,189 B2
(45) Date of Patent: Mar. 28, 2017

(54) CAMERA MODULE

(71) Applicant: SAMSUNG ELECTRO-MECHANICS CO., LTD., Suwon (KR)

(72) Inventors: Sang Jin Lee, Suwon (KR); Young Mu Kwon, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 414 days.

(21) Appl. No.: 13/950,200

(22) Filed: Jul. 24, 2013

(65) Prior Publication Data
US 2014/0293063 A1 Oct. 2, 2014

(30) Foreign Application Priority Data
Mar. 29, 2013 (KR) .......................... 10-2013-0034898

(51) Int. Cl.
H04N 5/33 (2006.01)
H04N 5/225 (2006.01)

(52) U.S. Cl.
CPC ......... *H04N 5/2254* (2013.01); *H04N 5/2257* (2013.01)

(58) Field of Classification Search
CPC .... H04N 5/2257; H04N 5/2254; G02B 7/021; G02B 13/0035
USPC ........................................................ 348/164
See application file for complete search history.

(56) References Cited

U.S. PATENT DOCUMENTS

| 7,567,285 | B2 | 7/2009 | Kwon et al. |
| 8,416,514 | B2 | 4/2013 | Kim et al. |
| 8,786,041 | B2 | 7/2014 | Iwafuchi et al. |
| 2008/0094738 | A1* | 4/2008 | Lee .................. G02B 7/021 359/829 |
| 2008/0191333 | A1 | 8/2008 | Yang et al. |
| 2009/0045476 | A1 | 2/2009 | Peng et al. |
| 2010/0044814 | A1* | 2/2010 | Lin ................... G02B 7/021 257/432 |
| 2010/0321802 | A1* | 12/2010 | Kim ............... B29D 11/00403 359/811 |
| 2012/0211852 | A1 | 8/2012 | Iwafuchi et al. |

(Continued)

FOREIGN PATENT DOCUMENTS

| CN | 1673791 A | 9/2005 |
| CN | 2891286 Y | 4/2007 |

(Continued)

OTHER PUBLICATIONS

Office Action issued on Sep. 16, 2015 in the corresponding Korean Patent Application No. 10-2013-0034898, 5 pages in English, 4 pages in Korean.

(Continued)

*Primary Examiner* — Thai Tran
*Assistant Examiner* — Jose Mesa
(74) *Attorney, Agent, or Firm* — NSIP Law

(57) ABSTRACT

There is provided a camera module including a lens barrel including at least one lens disposed on an optical axis, a housing having the lens barrel disposed therein, and an infrared (IR) filter bonded to an inside of the housing and disposed below the lens barrel, wherein the IR filter has a coating material applied to a portion of one surface thereof so as to block diffusely reflected light.

16 Claims, 8 Drawing Sheets

(56) References Cited

U.S. PATENT DOCUMENTS

2012/0229690 A1* 9/2012 Wang .................. H04N 5/2257
348/340

FOREIGN PATENT DOCUMENTS

| CN | 101262002 A | 9/2008 |
|----|----|----|
| CN | 101369543 A | 2/2009 |
| CN | 101909865 A | 12/2010 |
| CN | 102646690 A | 8/2012 |
| JP | 2006-267692 | 10/2006 |
| KR | 10-2007-007136 A | 7/2007 |
| KR | 10-2009-0036754 A | 4/2009 |
| KR | 10-2012-0095305 A | 8/2012 |

OTHER PUBLICATIONS

Chinese Office Action issued on May 31, 2016 in counterpart Chinese Patent Application No. 201310322238.1 (11 pages in English; 8 pages in Chinese).

* cited by examiner

CAMERA MODULE

CROSS-REFERENCE TO RELATED APPLICATIONS

This application claims the priority of Korean Patent Application No. 10-2013-0034898 filed on Mar. 29, 2013, in the Korean Intellectual Property Office, the disclosure of which is incorporated herein by reference in its entirety.

BACKGROUND OF THE INVENTION

Field of the Invention

The present invention relates to a camera module.

Description of the Related Art

In general, portable communications terminals, such as mobile phones, PDAs, portable PCs, and the like, tend to have a function of transmitting image data in addition to character or voice data.

In accordance with the recent tendency, portable communications terminals are commonly provided with a camera module to transmit image data, facilitate video chatting, and the like.

In the camera module, an infrared filter may be used.

The camera module may recognize abroad spectrum of light wavelengths, which may not be recognized by a human eye, and therefore, may recognize an infrared light wavelength region, which may not be recognized by a human eye.

Accordingly, when the camera module outputs image information recognized by light as it actually is, the camera module may output an image with colors different from those actually seen by a person. Therefore, there is a need to filter infrared rays using an infrared filter.

In this case, when the infrared filter is fixed within a housing of a camera module, light having passed through a lens, may be diffusely reflected to an inner wall of the housing or the like and introduced to an image sensor.

In this case, a flare phenomenon, such as light spreading, or the like, may occur, which may have an adverse effect on image quality. Therefore, there is a need to prevent light, diffusely reflected in the camera module, from being introduced to the image sensor.

SUMMARY OF THE INVENTION

An aspect of the present invention provides a camera module capable of preventing light from being introduced to an image sensor even in the case that the light has passed through a lens and diffusely reflected in the camera module and allowing an infrared filter to be securely fixed a housing.

According to an aspect of the present invention, there is provided a camera module, including: a lens barrel including at least one lens disposed on an optical axis; a housing having the lens barrel disposed therein; and an infrared (IR) filter bonded to an inside of the housing and disposed below the lens barrel, wherein the IR filter has a coating material applied to a portion of one surface thereof so as to block diffusely reflected light.

An inner surface of the housing may be provided with a protrusion protruding inwardly in a horizontal direction and the IR filter is attached to the protrusion.

A length of the coating material in the horizontal direction may be equal to or larger than a length of the protrusion in an optical axis direction.

An area of the coating material may be equal to or larger than that of an inner wall of the protrusion.

The infrared filter may include a bonding part bonded to the housing and a light transmissive part allowing light having passed through the lens to be transmitted therethrough.

The coating material may be applied to the bonding part and a portion of the light transmissive part extending inwardly in the horizontal direction from the bonding part.

The coating material may be applied to a portion of a top surface of the light transmissive part and a top surface of the bonding part.

The coating material may be applied to a portion of a bottom surface of the light transmissive part and a bottom surface of the bonding part.

The bonding part may be provided with at least one hole penetrating through the IR filter.

The plurality of holes may be spaced apart from each other with a predetermined interval therebetween.

The coating material may be applied to extend inwardly in the horizontal direction from a position corresponding to an inner wall of the protrusion, in the one surface of the IR filter.

The coating material may be applied to the IR filter in a chamfered manner in which respective corners of the coating material are beveled.

The coating material may be applied to a portion of one surface of the light transmissive part.

The IR filter may be bonded to the housing by a UV adhesive.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
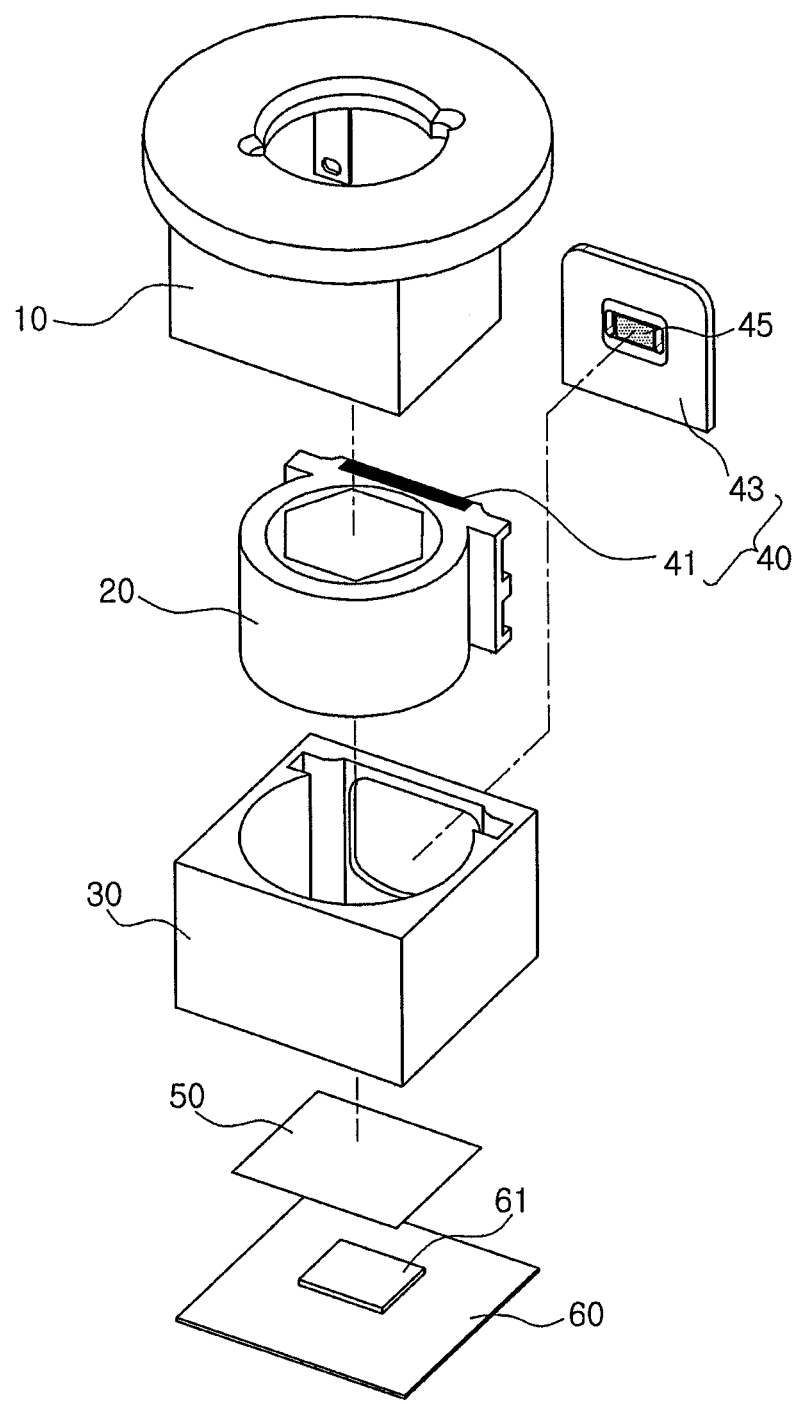
FIG. 1 is an exploded perspective view of a camera module according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is an exploded perspective view of a camera module according to an embodiment of the present invention.

Referring to FIG. 1, the camera module according to the embodiment of the present invention may include a lens barrel 20, a housing 30, a case 10, an actuator 40, an infrared filter 50, an image sensor 61, and a printed circuit board 60.

First, when defining terms regarding directions, an optical axis direction refers to a vertical direction, based on the lens barrel 20, and a horizontal direction refers to a direction perpendicular with respect to the optical axis.

The lens barrel 20 may have a hollow cylindrical shape so as to receive at least one lens for capturing a subject image therein and the lens may be disposed in the lens barrel 20 on the optical axis.

The lens barrel 20 may be coupled to the housing 30. In detail, the lens barrel 20 may be disposed in the housing 30.

Herein, for auto focusing, the lens barrel 20 may move in the optical axis direction.

In order to move the lens barrel 20 in the optical axis direction, the actuator 40, including a voice coil motor, may be included in the housing 30.

The actuator 40 may include a coil 43, a magnet 41, and a yoke (not illustrated) and the coil 43 may move the lens barrel 20 in the optical axis direction through attractive and repulsive force exerted by the magnet 41 adjacent thereto.

The magnet 41 generates a constant amount of magnetic force and when power is applied to the coil 43, driving force generated by electromagnetic force between the magnet 41 and the coil 43 may move the lens barrel 20 in the optical axis direction.

However, a means of transferring the lens barrel 20 is not limited to the actuator 40 including the voice coil motor (VCM), and various methods, such as a mechanical driving method, a piezoelectric driving method using a piezoelectric element, and the like, may be used therefor.

An auto focusing function or a zoom function may be performed by moving the lens barrel 20 in the foregoing operation.

Meanwhile, a center of the coil 43 may be provided with a position sensor 45.

The position sensor 45 senses a current position of the lens barrel 20 and provides information regarding the sensed position to a control unit (not illustrated) and the control unit (not illustrated) may control the movements of the lens barrel 20 using information regarding the current position of the lens barrel 20 received from the position sensor 45 and information regarding a destination position to which the lens barrel 20 is transferred.

Since the position sensor 45 is disposed in the center of the coil 43, a separate space for disposing the position sensor 45 in the housing 30 may not be required, such that the actuator 40 may be miniaturized and a manufacturing tolerance may be reduced during a manufacturing process.

The case 10 may be coupled to the housing 30 to enclose an outer circumferential surface of the housing 30 and the case 10 may serve to shield an electromagnetic wave generated during the driving of the camera module.

That is, the camera module generates an electromagnetic wave at the time of driving thereof and when the electromagnetic wave is emitted to the outside of the camera module, other electronic components may be affected by the electromagnetic wave to cause a communications failure or a malfunction thereof.

Therefore, in order to prevent the electromagnetic wave from being emitted to the outside, the case 10 may be coupled to the housing 30.

A top portion of the case 10 may have a cylindrical shape and a bottom portion of the case 10 may have a rectangular parallelepiped shape; however, the top and bottom portions of the case are not limited to having the foregoing shapes. Therefore, the shapes of the top and bottom portions of the case may be variously changed depending on a shape of the housing 30 and a shape of a mobile communications device in which the camera module is mounted.

The top portion of the case 10 may be provided with a through hole so as to allow external light to be incident through the lens barrel 20 and the external light incident through the through hole may be received in the image sensor 61 through the lens.

Here, window glass 70 may be mounted on the top portion of the case 10 so as to cover the through hole and protect the lens.

The top portion of the case 10 may be provided with a stepped part in order to stably mount the window glass 70 on the top portion of the case 10.

The image sensor 61, such as CCD, CMOS, or the like, may be mounted on the printed circuit board 60 by wire bonding and the printed circuit board 60 may be coupled to the bottom portion of the housing 30.

The subject image is collected on the image sensor 61 to be stored in a memory in the device as data. The stored data may be displayed as images on a display medium in the device.

Here, the infrared (IR) filter 50 may be disposed between the lens barrel 20 and the image sensor 61.

That is, the IR filter 50 may be disposed below the lens barrel 20.

The light having passed through the lens, may be transmitted through the IR filter 50, such that infrared rays may be blocked by the IR filter 50. Therefore, the introduction of infrared rays to the image sensor 61 may be prevented.

Figure 2:
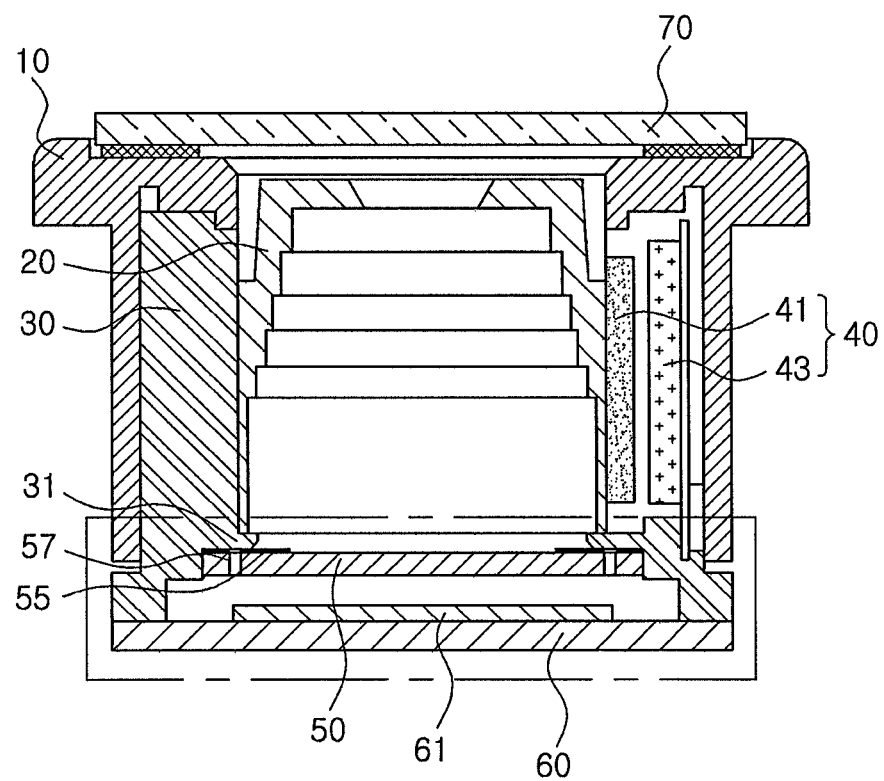
FIG. 2 is a cross-sectional view of the camera module according to the embodiment of the present invention.
Figure 3A:
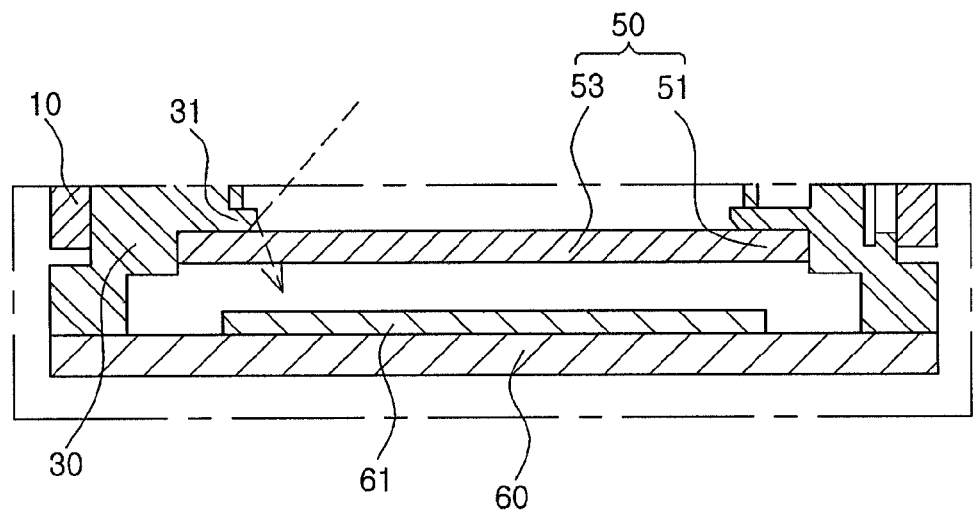
FIG. 3A is a schematic cross-sectional view of the camera module illustrating a state in which light is diffusely reflected to an image sensor.
Figure 3B:
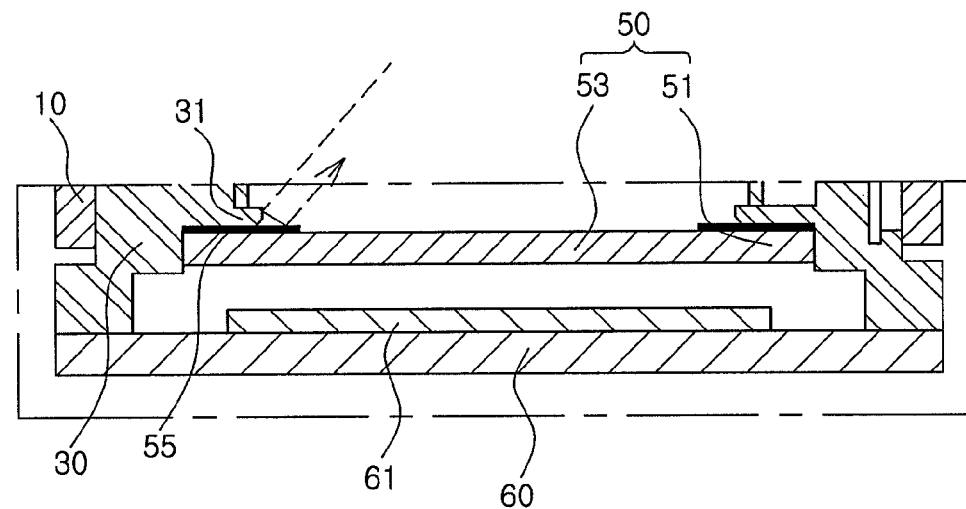
FIG. 3B is a schematic cross-sectional view illustrating a state in which light diffusely reflected in the camera module according to the embodiment of the present invention is blocked.

FIG. 2 is a cross-sectional view of the camera module according to the embodiment of the present invention, FIG. 3A is a schematic cross-sectional view of the camera module illustrating a state in which light is diffusely reflected to an image sensor, and FIG. 3B is a schematic cross-sectional view illustrating a state in which light diffusely reflected in the camera module according to the embodiment of the present invention is blocked.

Figure 4:
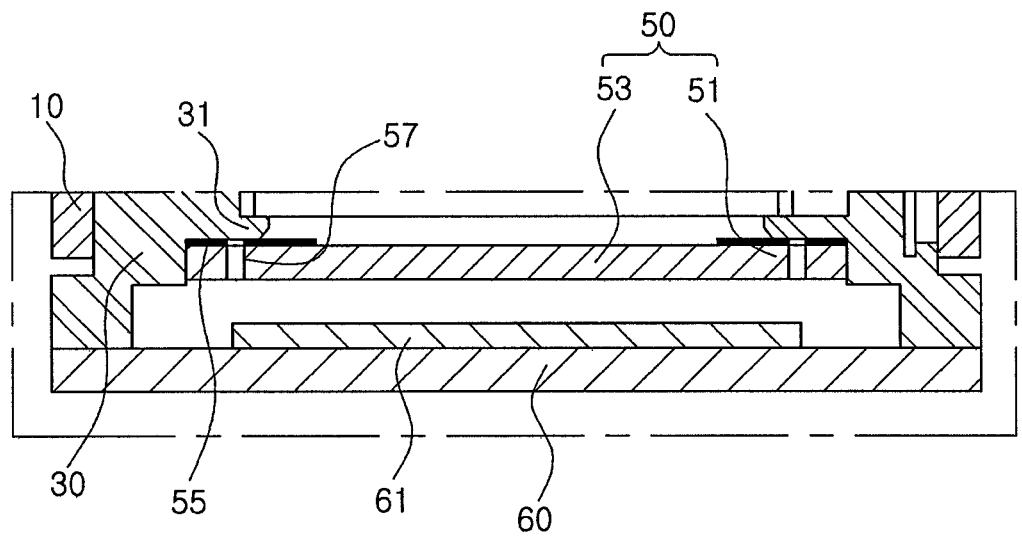
FIG. 4 is a partially enlarged cross-sectional view of FIG. 2.

Further, FIG. 4 is a partially enlarged cross-sectional view of FIG. 2.

First, a process of preventing light diffusely reflected in the camera module according to the embodiment of the present invention will be described with reference to FIGS. 3A and 3B.

The light incident on the camera module transmits the lens included in the lens barrel and is collected on the image sensor 61 through the IR filter.

Further, the light collected on the image sensor 61 is converted into an electrical signal to form an image.

Here, as illustrated in FIG. 3A, the light having passed through the lens may be reflected to an inner wall of the housing 30, and the like and the diffusely reflected light may arrive at the image sensor 61.

When light is reflected or scattered in an optical device, light may be overlapped on an image of a subject to be observed originally, such that image quality may be degraded.

That is, light which is diffusely reflected and arrives at the image sensor 61 may cause a flare phenomenon, such as light spreading, and the like, which may have an adverse effect on the image quality.

Therefore, a coating material 55 may be applied to one surface of the IR filter 50 so as to prevent light from being diffusely reflected in the camera module according to the embodiment of the present invention.

As illustrated in FIG. 3B, an edge portion of the IR filter 50 may have the coating material 55 applied thereto.

In detail, the coating material 55 may be applied to one surface of the IR filter 50 inwardly in the horizontal direction from an outer end of the IR filter 50.

Further, as the coating material 55, a reflective material reflecting light may be used.

Therefore, even in the case in which the light having passed through the lens is reflected to the inner wall of the housing 30, and the like, the light may be again reflected by the coating material 55, such that the introduction of the diffusely reflected light to the image sensor 61 may be prevented.

A coupling method of the housing 30 and the IR filter 50, a structure of the IR filter 50, and a position to which the coating material 55 is applied will be described in detail with reference to FIG. 4.

Referring to FIG. 4, an inner surface of the housing 30 may be provided with a protrusion 31 protruding inwardly in the horizontal direction and the infrared filter 50 may be attached to the protrusion 31.

Here, in the IR filter 50, a part thereof bonded to the housing 30 may be a bonding part 51 and a part thereof allowing the light having passed through the lens to be transmitted therethrough may be a light transmissive part 53.

The coating material 55 may be applied to the bonding part 51 and a portion (that is, a portion adjacent to the bonding part 51) of the light transmissive part 53 extending inwardly in the horizontal direction from the bonding part 51, in the IR filter 50.

That is, the coating material 55 may be coated to a portion of the light transmissive part 53 and the bonding part 51 and an area occupied by the coating material 55 in the light transmissive part 53 may be appropriately determined in consideration of light reflected to the inner wall of the housing 30, and the like.

The coating material 55 may be applied to at least one of a top surface and a bottom surface of the IR filter 50.

When the coating material 55 is applied to the top surface of the IR filter 50, the coating material 55 may be applied to a portion of a top surface of the light transmissive part 53 and a top surface of the bonding part 51 and when the coating material 55 is applied to the bottom surface of the IR filter 50, the coating material 55 may be applied to a portion of a bottom surface of the light transmissive part 53 and a bottom surface of the bonding part 51.

However, the embodiment of the present invention is not limited to the case in which the coating material 55 is applied only to any one surface of the IR filter 50, and therefore the coating material may be applied to both of the top and bottom surfaces of the IR filter 50.

In the camera module according to the embodiment of the present invention, the coating material 55 may be applied to one surface of the IR filter 50 to prevent light diffusely reflected to the inner wall of the housing 30, and the like, from being introduced to the image sensor.

Here, the infrared filter 50 and the housing 30 may be bonded to each other by a UV adhesive (not illustrated). In this case, light for UV curing is blocked by the coating material 55 applied to the IR filter 50, and therefore it may be difficult to perform curing of the UV adhesive.

Therefore, the IR filter 50 may be provided with at least one hole 57 to allow light for UV curing to be transmitted therethrough.

In detail, the hole 57 may penetrate through the IR filter 50 and the light for UV curing may reach the UV adhesive (not illustrated) between the housing 30 and the IR filter 50 through the hole 57.

The hole 57 may be formed in the bonding part 51 of the IR filter 50 and when the plurality of holes 57 are provided, the holes may be spaced apart from each other with a predetermined interval therebetween.

Figure 5:
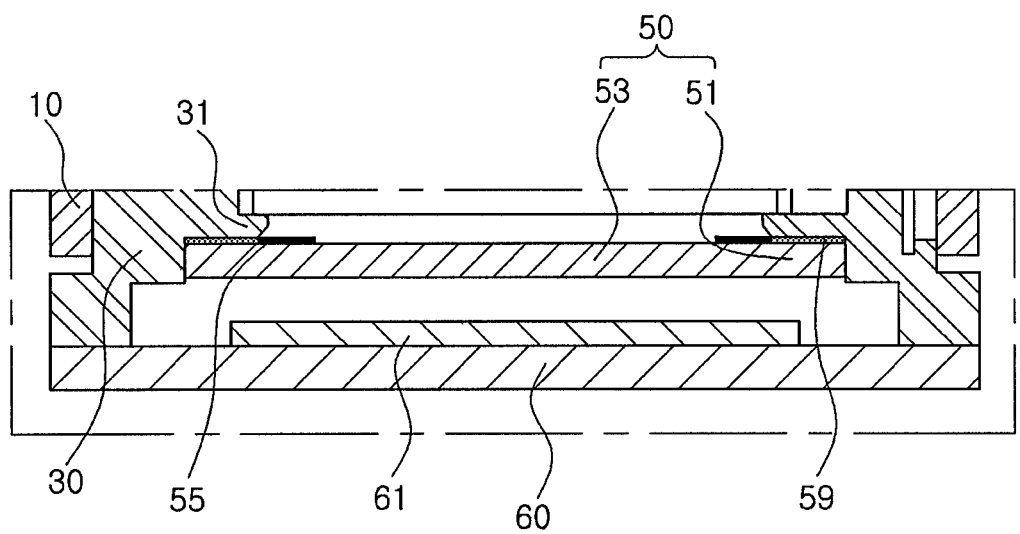
FIG. 5 is a partial cross-sectional view of a camera module according to another embodiment of the present invention.
Figure 6:
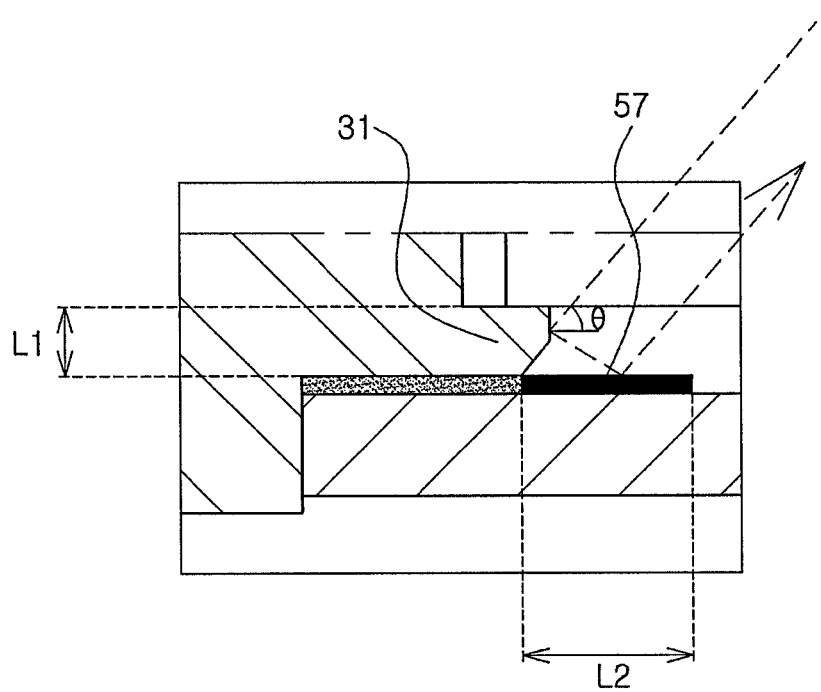
FIG. 6 is a partially enlarged cross-sectional view of FIG. 5.

FIG. 5 is a partial cross-sectional view of a camera module according to another embodiment of the present invention and FIG. 6 is a partially enlarged cross-sectional view of FIG. 5.

Referring to FIGS. 5 and 6, the camera module according to another embodiment of the present invention is the same as the camera module according to the foregoing embodiment of the present invention, other than the position to which the coating material 55 is applied and whether or not the hole 57 is included, and therefore the description of other portions except for the position to which the coating material 55 is applied and whether or not the hole 57 is included will be omitted.

In the camera module according to another embodiment of the present invention, the coating material 55 may be applied to a portion of the light transmissive part 53 of the IR filter 50.

That is, unlike the camera module according to the embodiment of the present invention, the coating material 55 may not be applied to the bonding part 51 of the IR filter 50 and may be applied only to a portion of the light transmissive part 53.

In detail, the coating material 55 may be applied inwardly in the horizontal direction from a position of the IR filter 50 corresponding to the inner wall of the protrusion 31 of the housing 30.

That is, the coating material may be applied to a portion (that is, a portion adjacent to the inner wall of the protrusion 31) of the light transmissive part 53.

The area occupied by the coating material 55 in the light transmissive part 53 may be appropriately determined in consideration of the light reflected to the inner wall of the housing 30, and the like.

The coating material 55 may be applied to at least one of the top surface and the bottom surface of the IR filter 50.

However, the embodiment of the present invention is not limited to the case in which the coating material 55 is applied only to any one surface of the IR filter 50, and therefore the coating material may be applied to both of the top and bottom surfaces of the IR filter 50.

In the camera module according to another embodiment of the present invention, the coating material 55 may be applied to one surface of the IR filter 50 to prevent light diffusely reflected to the inner wall of the housing 30, and the like, from being introduced to the image sensor.

Here, the IR filter 50 and the housing 30 may be bonded to each other by using a UV adhesive 59 and the UV adhesive 59 may be applied to the bonding part 51 of the IR filter 50.

In the camera module according another embodiment of the present invention, the coating material 55 is not applied to the bonding part 51, such that the light for UV curing may not be blocked.

Therefore, the light for UV curing may transmit through the bonding part 51, without a separate hole formed in the IR filter 50.

Here, a length of the protrusion 31 of the housing 30 in the optical axis direction may refer to L1 and a length of the portion to which the coating material 55 is applied in the horizontal direction may refer to L2.

The length of the portion to which the coating material 55 is applied in the horizontal direction may be equal to or larger than the length of the protrusion 31 in the optical axis direction.

That is, L1≤L2 may be satisfied.

However, the L2 may be greater than L1 in consideration of a tolerance of a region in which light is diffusely reflected.

Further, an area of the portion to which the coating material 55 is applied in the light transmissive part 53 of the IR filter 50 may be equal to or larger than that of the inner wall of the protrusion 31.

Meanwhile, as an incident angle θ at which the light having passed through the lens meets the inner wall of the protrusion 31 becomes small, the L2 may become large.

That is, the L2 may be appropriately formed in consideration of the minimum incident angle θ at which the light having passed through the lens meets the inner wall of the protrusion 31.

Figure 7:
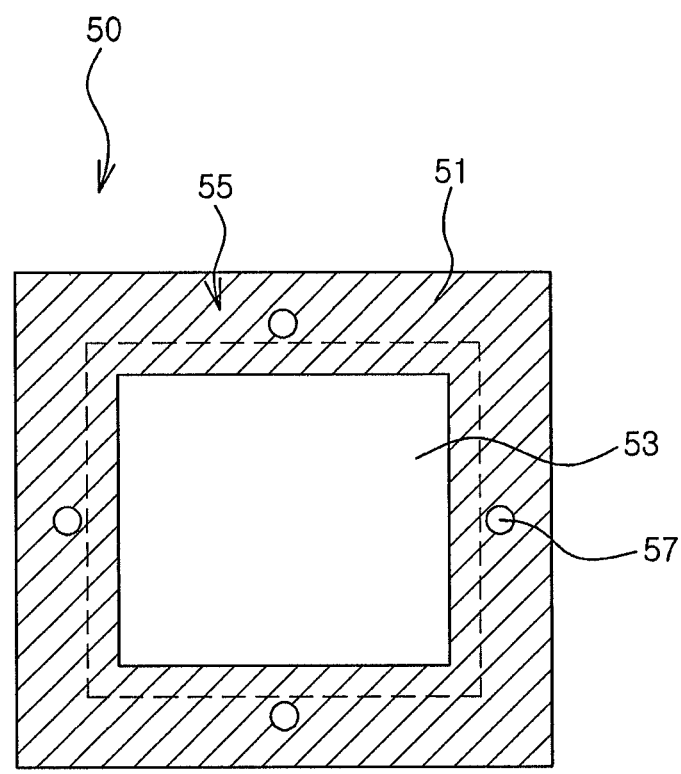
FIG. 7 is a plan view of an infrared filter included in the camera module according to the embodiment of the present invention.

FIG. 7 is a plan view of the infrared filter included in the camera module according to the embodiment of the present invention.

Referring to FIG. 7, the IR filter 50 may include the bonding part 51 and the light transmissive part 53.

The bonding part 51, a part by which the IR filter 50 is bonded to the protrusion 31 of the housing 30, may be a region represented by a dotted line (see FIG. 5) on the outer end of the IR filter 50.

The light transmissive part 53, a part allowing the light having passed through the lens to be transmitted therethrough, may be a region other than the bonding part 51 of the IR filter 50 and in detail, may refer to an inner portion based on the dotted line of FIG. 7.

Here, the coating material 55 may be applied to the bonding part 51 and a portion of the light transmissive part 53 extending from the bonding part 51.

That is, the coating material 55 may be applied to a portion of one surface of the light transmissive part 53 and one surface of the bonding part 51.

Meanwhile, the bonding part 51 may be provided with at least one hole 57 penetrating through the IR filter 50 and the hole 57 may serve to transmit the light for UV curing.

Therefore, in the camera module according to the embodiment of the present invention, the coating material 55 may be applied to the IR filter 50 to prevent the diffusely reflected light from being introduced to the image sensor 61 and the hole 57 is formed in the IR filter 50 to transmit the light for UV curing to firmly fix the IR filter 50 to the housing 30.

Figure 8:
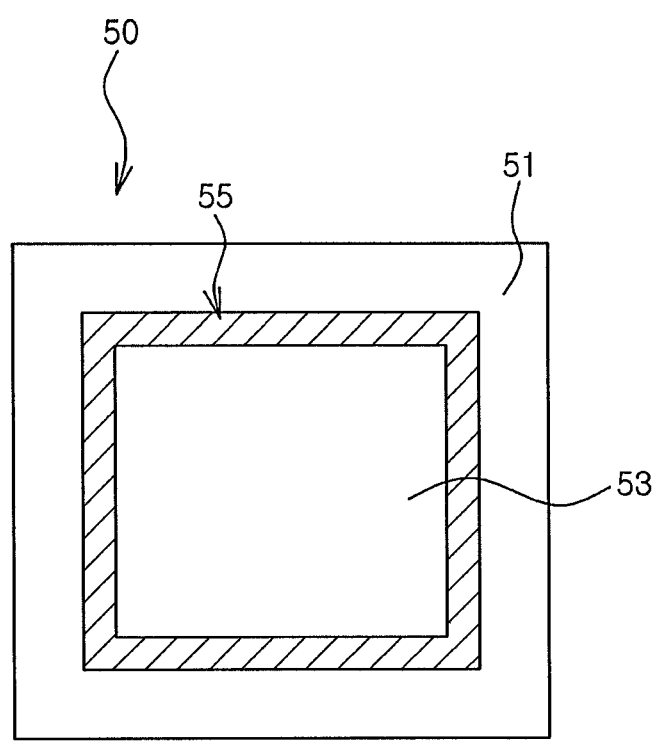
FIG. 8 is a plan view of an infrared filter included in a camera module according to another embodiment of the present invention.

FIG. 8 is a plan view of the infrared filter included in the camera module according to another embodiment of the present invention.

Referring to FIG. 8, the camera module according to another embodiment of the present invention is the same as the camera module according to the foregoing embodiment of the present invention, other than the position to which the coating material 55 is applied, and therefore the description of portions except for the position to which the coating material 55 is applied will be omitted.

The IR filter 50 may include the bonding part 51, a part bonded to the housing 30 and the light transmissive part 53 allowing light having passed through the lens to be transmitted therethrough, and the coating material 55 may be applied to a portion of one surface of the light transmissive part 53.

In detail, the coating material 55 may be applied inwardly in the horizontal direction from a position corresponding to the inner wall of the protrusion 31, in the IR filter 50.

That is, in the camera module according to another embodiment of the present invention, the coating material 55 may not be applied to the bonding part 51 of the IR filter 50 and may only be applied to a portion (that is, a portion adjacent to the inner wall of the protrusion 31) of the light transmissive part 53.

Since the coating material 55 is not applied to the bonding part 51 of the IR filter 50, the light for UV curing may pass through the bonding part 51 of the IR filter 50 and then arrive at the UV adhesive between the housing 30 and the IR filter 50.

Therefore, the IR filter 50 may be firmly fixed to the housing 30.

Meanwhile, the introduction of the light diffusely reflected to the inner wall of the housing 30, and the like, to the image sensor 61 may be prevented by the coating material 55 applied to a portion of one surface of the light transmissive part 53 of the IR filter 50.

Figure 9:
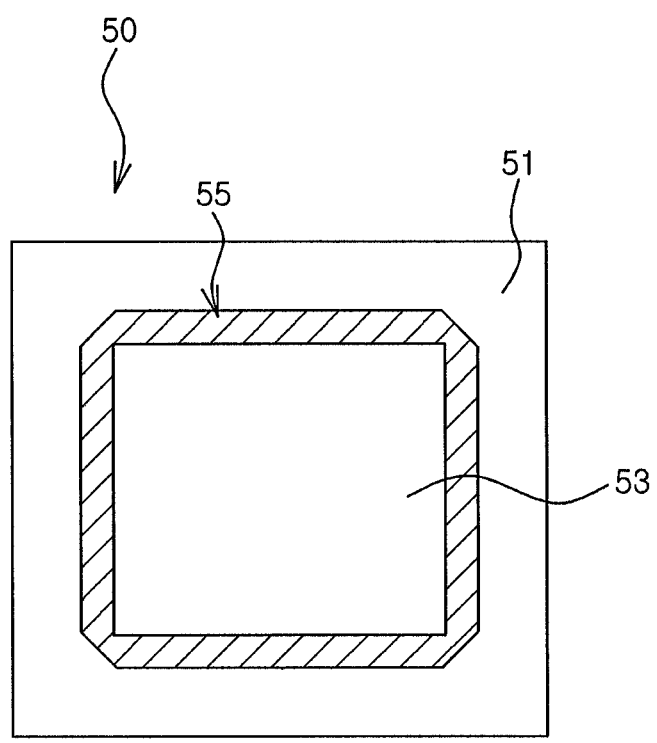
FIG. 9 is a plan view illustrating a modified example of the infrared filter included in the camera module according to another embodiment of the present invention.

FIG. 9 is a plan view illustrating a modified example of the infrared filter included in the camera module according to another embodiment of the present invention.

Referring to FIG. 9, the camera module according to another embodiment of the present invention is the same as the camera module described with reference to FIG. 8 other than an application shape of the coating material 55, and therefore the description except for the application shape of the coating material 55 will be omitted.

The coating material 55 may be applied to a portion of one surface of the light transmissive part 53. In detail, the coating material 55 may be applied inwardly in the horizontal direction from a position corresponding to the inner wall of the protrusion 31, in the IR filter 50.

That is, the coating material may be applied to a portion (that is, a portion adjacent to the inner wall of the protrusion 31) of the light transmissive part 53.

The coating material 55 may be applied to a portion of the light transmissive part 53 in a chamfered manner in which respective corners of the coating material 55 are beveled.

Through the configuration, the amount of the UV adhesive applied between the IR filter 50 and the housing 30 may increase, and therefore the IR filter 50 may be more firmly attached to the housing 30.

Through the foregoing embodiments, in the camera module according to the embodiment of the present invention, it may be possible to prevent the diffusely reflected light from being introduced to the image sensor and firmly fix the IR filter to the housing.

As set forth above, with the camera module according to the embodiments of the present invention, even in the case that the light having passed through the lens is diffusely reflected in the camera module, the introduction of the light to the image sensor can be prevented and the infrared filter can be firmly fixed in the housing.

While the present invention has been shown and described in connection with the embodiments, it will be apparent to those skilled in the art that modifications and variations can be made without departing from the spirit and scope of the invention as defined by the appended claims.

What is claimed is:

1. A camera module, comprising:
   a lens barrel, including a lens disposed on an optical axis;
   a housing having the lens barrel disposed therein; and
   an infrared (IR) filter, bonded to an inside of the housing and disposed on the optical axis,
   wherein the IR filter has a coating material applied to a portion of a surface thereof,
   wherein the coating material is configured to block diffusely reflected light,
   wherein a remainder of the surface of the IR filter, that does not have the coating material applied thereto, is configured to block infrared rays, and
   wherein a hole is formed in the IR filter, and the hole penetrates through the IR filter in an optical axis direction.

2. The camera module of claim 1,
   wherein an inner surface of the housing is provided with a protrusion protruding inwardly in a direction orthogonal to the optical axis, and
   wherein the IR filter is attached to the protrusion.

3. The camera module of claim 2, wherein a length of the coating material in the direction orthogonal to the optical axis is equal to or larger than a length of the protrusion in an optical axis direction.

4. The camera module of claim 2, wherein an area of the coating material is equal to or larger than that of an inner wall of the protrusion.

5. The camera module of claim 2, wherein the infrared filter includes a bonding part bonded to the housing and a light transmissive part allowing light having passed through the lens to be transmitted therethrough.

6. The camera module of claim 5, wherein the coating material is applied to the bonding part and a portion of the light transmissive part extending inwardly from the bonding part, in the direction orthogonal to the optical axis.

7. The camera module of claim 5, wherein the coating material is applied to a portion of a top surface of the light transmissive part and a top surface of the bonding part.

8. The camera module of claim 5, wherein the coating material is applied to a portion of a bottom surface of the light transmissive part and a bottom surface of the bonding part.

9. The camera module of claim 5, wherein the hole penetrates through a bonding part of the IR filter, the bonding part comprising at least a portion of the coating material.

10. The camera module of claim 9, wherein a plurality of holes are spaced apart from each other with a predetermined interval therebetween.

11. The camera module of claim 2, wherein the coating material is applied to extend inwardly from a position corresponding to an inner wall of the protrusion, in the direction orthogonal to the optical axis, in a surface of the IR filter.

12. The camera module of claim 11, wherein the coating material is applied to the IR filter in a chamfered manner in which respective corners of the coating material are beveled.

13. The camera module of claim 5, wherein the coating material is applied to a portion of a surface of the light transmissive part.

14. The camera module of claim 1, wherein the IR filter is bonded to the housing by a UV adhesive.

15. A camera module, comprising:
    a lens barrel including at least one lens disposed on an optical axis;
    a housing having the lens barrel disposed therein, and a protrusion protruding toward the optical axis; and
    an infrared (IR) filter attached to the protrusion, configured to block infrared rays, and disposed below the lens barrel,
    wherein the IR filter has a coating material applied to a portion of one surface thereof so as to block diffusely reflected light,
    wherein the coating material extends in direction towards the optical axis but not in a direction towards the protrusion, and
    wherein a hole is formed in the IR filter, and the hole penetrates through the IR filter in an optical axis direction.

16. The camera module of claim 15, wherein the hole penetrates through a bonding part of the IR filter, the bonding part comprising at least a portion of the coating material.

* * * * *